US012621904B2

(12) United States Patent
Leng et al.

(10) Patent No.: US 12,621,904 B2
(45) Date of Patent: May 5, 2026

(54) METHOD FOR SIDELINK COMMUNICATION, TERMINAL DEVICE, NON-TRANSITORY COMPUTER-READABLE STORAGE MEDIUM

(71) Applicant: GUANGDONG OPPO MOBILE TELECOMMUNICATIONS CORP., LTD., Dongguan (CN)

(72) Inventors: Bingxue Leng, Dongguan (CN); Qianxi Lu, Dongguan (CN); Zhongda Du, Dongguan (CN); Shichang Zhang, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 343 days.

(21) Appl. No.: 18/354,877

(22) Filed: Jul. 19, 2023

(65) Prior Publication Data

US 2023/0363053 A1       Nov. 9, 2023

Related U.S. Application Data

(63) Continuation of application No. PCT/CN2021/083442, filed on Mar. 26, 2021.

(51) Int. Cl.
*H04W 76/28*          (2018.01)
*H04W 72/40*          (2023.01)
(52) U.S. Cl.
CPC .......... *H04W 76/28* (2018.02); *H04W 72/40* (2023.01)

(58) Field of Classification Search
CPC . H04W 76/28; H04W 72/40; H04W 28/0278; H04W 76/40; H04W 76/23; H04W 8/005; H04W 88/04; H04W 92/18; Y02D 30/70
See application file for complete search history.

(56) References Cited

U.S. PATENT DOCUMENTS

| | | | | | |
|---|---|---|---|---|---|
| 10,841,865 | B2 | 11/2020 | Wu et al. | | |
| 2021/0400639 | A1* | 12/2021 | Lee | ........................ | H04W 24/10 |
| 2023/0088615 | A1* | 3/2023 | Zhao | ...................... | H04W 4/06 |
| | | | | | 370/311 |
| 2023/0262835 | A1* | 8/2023 | Li | ......................... | H04W 76/40 |

FOREIGN PATENT DOCUMENTS

| | | |
|---|---|---|
| CN | 111466151 | 7/2020 |
| CN | 111757513 | 10/2020 |
| CN | 112423264 | 2/2021 |

(Continued)

OTHER PUBLICATIONS

CNIPA, Second Office Action for CN Application No. 202180078757.0, Dec. 5, 2024.

(Continued)

*Primary Examiner* — Rushil P. Sampat
(74) *Attorney, Agent, or Firm* — Hodgson Russ LLP

(57)          ABSTRACT

A method for sidelink (SL) communication is provided. The method includes the following. A terminal device receives assistance information (AI) transmitted by one or more other terminal devices. The terminal device determines a target terminal device and/or a transmission resource used for SL message transmission based on at least one of: the received AI, or a discontinuous reception (DRX) configuration of each other terminal device.

6 Claims, 11 Drawing Sheets

(56) References Cited

FOREIGN PATENT DOCUMENTS

| WO | 2020091494 | | 5/2020 |
|----|----|----|----|
| WO | WO 2020091494 A1 | * | 5/2020 |
| WO | WO 2022082537 A1 | * | 4/2022 |

OTHER PUBLICATIONS

"3rd Generation Partnership Project; Technical Specification Group Radio Access Network; NR; Medium Access Control (MAC) protocol specification (Release 16)," 3GPP TS 38.321, Dec. 2020, v16.3.0.

"3rd Generation Partnership Project; Technical Specification Group Radio Access Network; NR; Radio Resource Control (RRC) protocol specification (Release 16)," 3GPP TS 38.331, Jan. 2021, v16.3.1.

"3rd Generation Partnership Project; Technical Specification Group Radio Access Network; NR; Physical layer procedures for data (Release 16)," 3GPP TS 38.214, Dec. 2020, v16.4.0.

Fujitsu, "Considerations on Inter-UE Coordination for Mode 2 Enhancements," 3GPP TSG RAN WG1 Meeting #103-E, R1-2007788; Oct. 2020.

Lenovo et al., "Discussion on sidelink resource allocation enhancements," 3GPP TSG-RAN WG2 Meeting #113 electronic, R2-2101116, Jan. 2021.

WIPO, International Search Report and Written Opinion for International Application No. PCT/CN2021/083442, Nov. 23, 2021.

LG Electronics Inc., "Corrections to 5G V2X with NR Sidelink," 3GPP TSG-RAN WG2 Meeting #111-e, R2-2008630, Aug. 2020.

CNIPA, First Office Action for CN Application No. 202180078757. 0, Oct. 11, 2024.

* cited by examiner

METHOD FOR SIDELINK COMMUNICATION, TERMINAL DEVICE, NON-TRANSITORY COMPUTER-READABLE STORAGE MEDIUM

CROSS-REFERENCE TO RELATED APPLICATION(S)

This application is a continuation of International Application No. PCT/CN2021/083442, filed Mar. 26, 2021, the entire disclosure of which is incorporated herein by reference.

TECHNICAL FIELD

The present disclosure relates to the field of communications, and in particular, to a method for sidelink (SL) communication, a terminal device, and a non-transitory computer-readable storage medium.

BACKGROUND

Device to device (D2D) and vehicle to everything (V2X) technologies are important in mobile communications. In a D2D or V2X scenario, direct communication between devices can be supported through a sidelink (SL) transmission technology. Different from that communication data is received or transmitted through a base station in a conventional cellular system, an Internet of vehicles system can adopt a terminal-to-terminal direct communication mode, thereby having a higher spectrum efficiency and a lower transmission delay. A V2X system can support two transmission modes, namely mode-1 and mode-2. In mode-1, transmission resources for a terminal can be allocated by a network, and the terminal can transmit SL data on an SL according to the resources allocated by the network. In mode-2, the terminal can select resources from a resource pool for SL transmission. Conventional resource selection mode-2 has problems such as a half-duplex problem, a hidden-node problem, and a resource collision problem. As such, a terminal coordination mechanism for an SL can be introduced. However, due to introduction of discontinuous reception (DRX) technology to an SL system, the terminal needs to consider a DRX configuration of a receiving terminal in resource selection. Further, if there are assistance information (AI) from multiple terminals, how to comprehensively consider the AI from the multiple terminals to perform resource selection is a problem to be solved.

SUMMARY

In view of the above, implementations of the present disclosure provide a method for sidelink (SL) communication, a terminal device, and a non-transitory computer-readable storage medium.

Implementations of the present disclosure provide a method for SL communication. The method is applicable to a terminal device and includes the following. The terminal device receives AI transmitted by one or more other terminal devices. The terminal device determines a target terminal device and/or a transmission resource used for SL message transmission based on at least one of: the received AI, or a discontinuous reception (DRX) configuration of each other terminal device.

Implementations of the present disclosure further provide a terminal device. The terminal device includes a transceiver, a processor coupled to the transceiver, and a memory storing a computer program. The processor is configured to execute the computer program to cause the terminal device to receive AI transmitted by one or more other terminal devices, and determine a target terminal device and/or a transmission resource used for SL message transmission based on at least one of: the received AI, or a DRX configuration of each other terminal device.

Implementations of the present disclosure further provide a non-transitory computer-readable storage medium for storing a computer program, where the computer program enables a terminal device to perform the following. Receive AI transmitted by one or more other terminal devices. Determine a target terminal device and/or a transmission resource used for SL message transmission based on at least one of: the received AI, or a DRX configuration of each other terminal device

DETAILED DESCRIPTION

Figure 1:
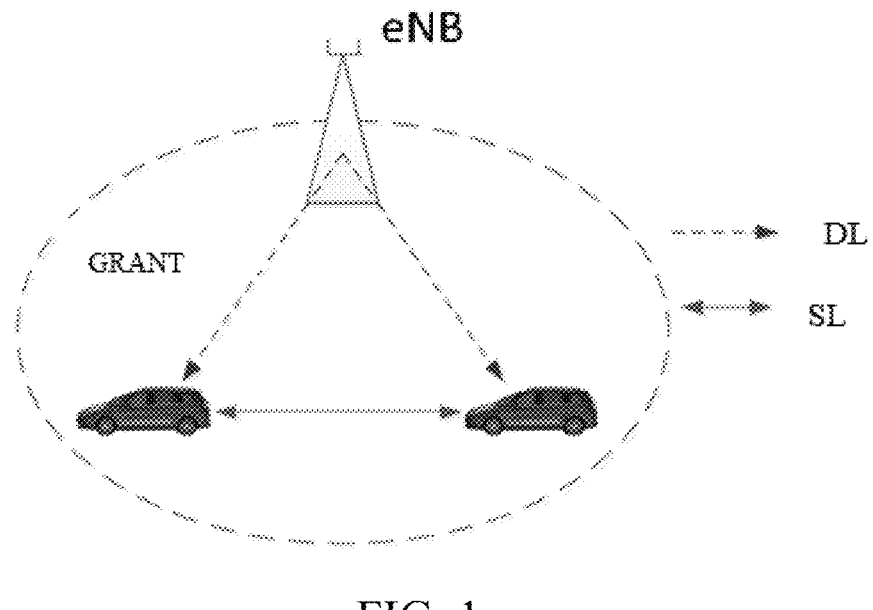
FIGS. 1 and 2 are schematic diagrams illustrating two types of sidelink (SL) communication system architectures according to implementations of the present disclosure.

The following describes technical solutions in implementations of the present disclosure with reference to accompanying drawings in the implementations of the present disclosure.

The technical solutions in the implementations of the present disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a 5th-generation (5G) system, or other communication systems.

Generally, a conventional communication system can support a limited number of connections and is easy to implement. However, with the development of communication technologies, the mobile communication system can support not only traditional communication, but also support, for example, device to device (D2D) communication, machine to machine (M2M) communication, machine type communication (MTC), vehicle to vehicle (V2V) communication, or vehicle to everything (V2X) communication, etc., and the implementations of the present disclosure can also be applied to these communication systems.

In the implementations of the present disclosure, the communication system may be applied to a carrier aggregation (CA) scenario, a dual connectivity (DC) scenario, and a standalone (SA) scenario.

In the implementations of the present disclosure, the terminal device may also be referred to as a user equipment (UE), an access terminal, a subscriber unit, a subscriber station, a mobile station, a remote station, a remote terminal, a mobile device, a user terminal, a terminal, a wireless communication device, a user agent, or a user device.

In the implementations of the present disclosure, the terminal device may also be a station (ST) in the WLAN, a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved public land mobile network (PLMN), etc.

In the implementations of the present disclosure, the terminal device may be deployed on land, including indoor or outdoor, handheld, wearable, or vehicle-mounted; on water (such as a ship; and also in the air (such as an airplane, a balloon, and a satellite).

In the implementations of the present disclosure, the terminal device may be a mobile phone, a pad, a computer with wireless transceiving functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

In the implementations of the present disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

In the implementations of the present disclosure, the network device may be a device that can communicate with a mobile device. The network device may be an access point (AP) in the WLAN, a base transceiver station (BTS) in the GSM or CDMA system, a NodeB (NB) in the WCDMA system, an evolutional NodeB (eNB or eNodeB), a relay station, an AP, an in-vehicle device, or a wearable device in the LTE, a generation NodeB (gNB) in the NR network, a network device in the future evolved PLMN, etc.

In the implementations of the present disclosure, the network device can have a mobility, e.g., the network device may be a mobile device. Optionally, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. Alternatively, the network device may also be a base station deployed on land, on water, or on other locations.

In the implementations of the present disclosure, the network device can provide service for a cell, and the terminal device can communicate with the network device through transmission resources (e.g., frequency-domain resources or spectrum resources) for the cell. The cell may be a cell corresponding to the network device (e.g., a base station). The cell may belong to a macro base station or a base station corresponding to a small cell. The small cell may include a metro cell, a micro cell, a pico cell, a femto cell, or the like. These small cells have features of small coverage ranges and low transmission power and are suitable for providing high-speed data transmission services.

It can be understood that, the terms "system" and "network" in the present disclosure are often used interchangeably. The term "and/or" in the present disclosure is simply an illustration of an association relationship of associated objects, indicating that three relationships may exist, for example, A and/or B, which may indicate the existence of A alone, A and B together, and B alone. In addition, the character "/" in the present disclosure generally indicates that associated objects are in an "or" relationship. In illustration of the implementations of the present disclosure, the term "correspondence" may represent a direct correspondence or indirect correspondence between the two, may also represent an associated relation between the two, or may further represent a relation of indicating and being indicated, a relation of configuring and being configured, or other relations.

In order to clearly illustrate the idea of the implementations of the present disclosure, the related content of SL transmission in the communication system is briefly described first.

Figure 2:
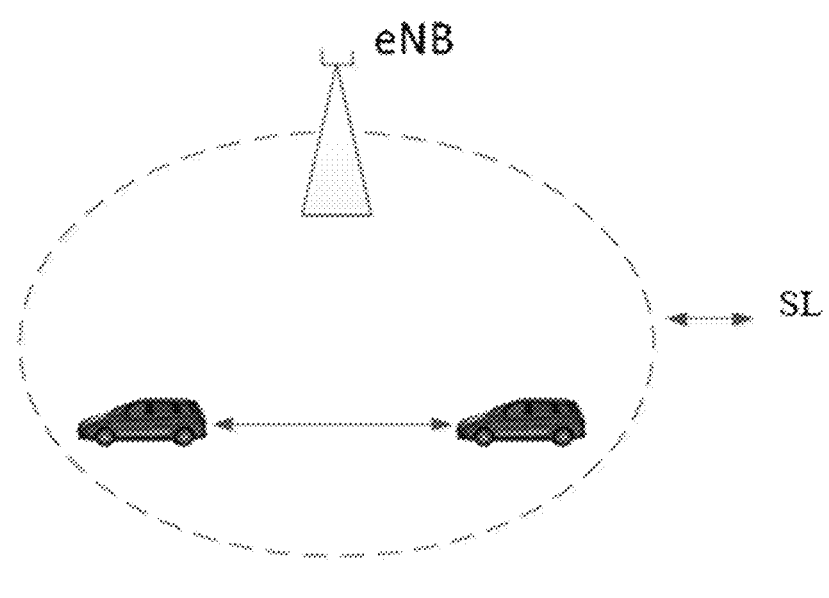

Two transmission modes are defined in an LTE D2D/V2X system, which are respectively mode A and mode B. With reference to FIGS. 1 and 2, in mode A, a transmission resource for a terminal is allocated by a base station, and the terminal can transmit data on an SL according to the resource allocated by the base station. The base station may allocate a transmission resource for single transmission to the terminal, or may also allocate a semi-persistent transmission resource to the terminal. In mode B, the terminal selects a resource from a resource pool to perform data transmission. In 3rd generation partnership project (3GPP), D2D is divided into different stages for research, which is described below by using examples.

Proximity based service (ProSe): in the ProSe, by configuring the location of a resource pool in a time domain, for example, by configuring that the resource pool is discontinuous in the time domain, UE can discontinuously transmit/receive data on an SL, thereby achieving power saving.

V2X: in V2X, since a vehicle-mounted system has continuous power supply, power efficiency is not a major issue, while latency of data transmission is a major issue, and thus for system design, a terminal device needs to be able to perform continuous transmission and reception.

Wearable device (FeD2D): in FeD2D, according to the discussion, it can be considered that a base station can configure a discontinuous reception (DRX) parameter(s) for a remote terminal through a relay terminal, but specific details of how to perform DRX configuration have not been concluded.

With regard to the NR-V2X system, on the basis of the LTE-V2X system, the NR-V2X system is not limited to a broadcast scene, and can also be applied to unicast and multicast scenes. Similar to the LTE-V2X, in the NR-V2X two resource grant modes, i.e., mode-1 and mode-2 mentioned above, are defined. Further, the terminal may be in a mixed mode, and may not only obtain resources in mode-1, but also obtain resources in mode-2, where a resource location may be indicated through SL grant, for example, time and frequency locations of a corresponding physical sidelink control channel (PSCCH) and a physical sidelink shared channel (PSSCH) can be indicated through SL grant.

Similar to the LTE-V2X, in the NR-V2X, it can be considered that a terminal device such as a vehicle-mounted system has continuous power supply, and thus power efficiency is not a major issue, while latency of data transmission is a major issue. Therefore, for system design, the terminal device needs to be able to perform continuous transmission and reception.

With regard to the NR-V2X mode-2, in the NR-V2X system, some new characteristics are introduced, such as support for a large number of non-periodic services, increase of the number of retransmissions, and a relatively flexible resource reservation period. All these characteristics have great influence on the mode in which the terminal can autonomously select a resource. Therefore, in the 3GPP, a resource selection scheme applicable to the NR-V2X is re-discussed and designed on the basis of mode-4 in the LTE-V2X, which is denoted as mode-2. In mode-2, by decoding sidelink control information (SCI) transmitted by another UE and measuring SL reception power, UE can select, from a resource pool, a resource that is not reserved by another UE or a resource that is reserved by another UE but has a lower reception power. Resource selection in the NR-V2X mode-2 is divided into two main steps, that is, UE firstly determines a candidate resource set, and then selects a resource from the candidate resource set to transmit data.

Specifically, in step 1, UE determines a candidate resource set, i.e., determines a set of all available resources in a resource selection window as resource set A. Firstly, the UE needs to decide whether a resource is reserved by another UE according to a sensing result in a resource sensing window. The UE performs resource exclusion based on a non-sensing slot and a first-order SCI sensed. After the resource exclusion, if the number of remaining resources in resource set A is less than a proportion, the UE can increase a reference signal received power (RSRP) threshold by 3 dB, and repeat step 1 until the number of remaining resources in resource set A is greater than or equal to the proportion. Compared with that a proportion is fixed to be 20% in the LTE-V2X, in the NR-V2X, the value of the proportion is more flexible, and possible values of the proportion may be {20, 35, 50} %. The specific value of the proportion is preconfigured or configured by a network in units of a resource pool. Finally, resource set A obtained after resource exclusion is the candidate resource set for the UE.

In step 2, the UE selects (reserves) a transmission resource in the candidate resource set. The UE can randomly select with an equal probability one or more transmission resources from resource set A. It is to be noted that, during selection of one or more transmission resources, the following time-domain constraints need to be satisfied.

(1) Except for some exceptions, the UE needs to ensure that a retransmission resource selected can be indicated by a prior first-order SCI. The above exceptions include the following. After resource exclusion, the UE cannot select from resource set A a resource satisfying the time-domain constraints. Further, due to factors such as resource preemption, congestion control, and collision with an uplink service, the UE drops transmission, which results in that a transmission resource for a certain retransmission is not indicated by a prior first-order SCI.

(2) The UE needs to ensure that in any two selected time-frequency resources, the two resources are spaced apart in the time domain by at least a time gap Z in the case that a first transmission resource in the two resources needs hybrid automatic repeat request (HARQ) feedback. In the case that the time-domain constraints cannot be satisfied in resource selection, for example, in the case that a packet delay budget (PDB) is relatively short but the number of retransmissions is relatively large, depending on UE implementation, selection of some retransmission resources may be dropped or HARQ feedback may be deactivated for some transmissions.

With regard to a DRX mechanism, the UE can monitor a physical downlink control channel (PDCCH) discontinuously according to a DRX configuration to save power. In the case that the PDCCH includes identification information of the UE, for example, any one of: a cell radio network temporary identity (C-RNTI), a configured scheduling RNTI (CS-RNTI), an interruption RNTI (INT-RNTI), a slot format indication RNTI (SFI-RNTI), a semi-persistent CSI RNTI (SP-CSI-RNTI), and a transmit power control-physical uplink control channel-RNTI (TPC-PUCCH-RNTI), a TPC-physical uplink shared channel-RNTI (TPC-PUSCH-RNTI), or a TPC-sounding reference signal-RNTI (TPC-SRS-RNTI), the UE can perform a corresponding DRX operation based on control information. The network side can control the DRX behavior of the UE by configuring a series of parameters. The UE can be in a DRX activation state in at least one of the following conditions: running of drx-onDurationTimer or drx-InactivityTimer; running of drx-RetransmissionTimerDL or drx-RetransmissionTimerUL; running of ra-ContentionResolutiontimer or msgB-ResponseWindow; existence of a scheduling request (SR) that is not handled; and the PDCCH indicating a new transmission period.

Figure 3:
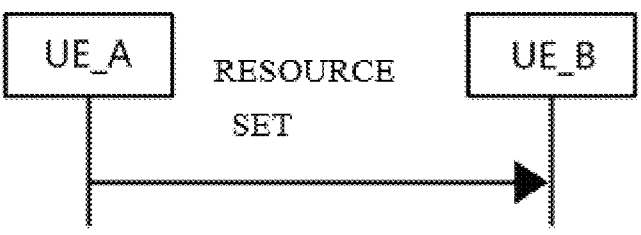
FIG. 3 is a schematic diagram illustrating assistance information (AI) transmission by a terminal device according to implementations of the present disclosure.

The conventional resource selection mode-2 has a half-duplex problem, a hidden-node problem, and a resource collision problem, and these problems can be solved by UE coordination mechanism for an SL, thereby improving the reliability and reducing latency in mode-2. The UE coordination mechanism for an SL may mainly include the following. UE-A can determine a resource set and transmits the resource set to UE-B through assistance information (AI), and UE-B in mode-2 can take the resource set into consideration in resource selection, and the specific process is illustrated in FIG. 3. Meanwhile, due to the introduction of the SL DRX technology, UE needs to consider a DRX configuration of a receiving UE in resource selection, so that for comprehensive consideration of the DRX configuration and the UE coordination mechanism in resource selection, and for that if there may be AI from multiple UEs, how to comprehensively consider the AI from the multiple UEs to perform resource selection, there may be no conclusion.

Figure 4:
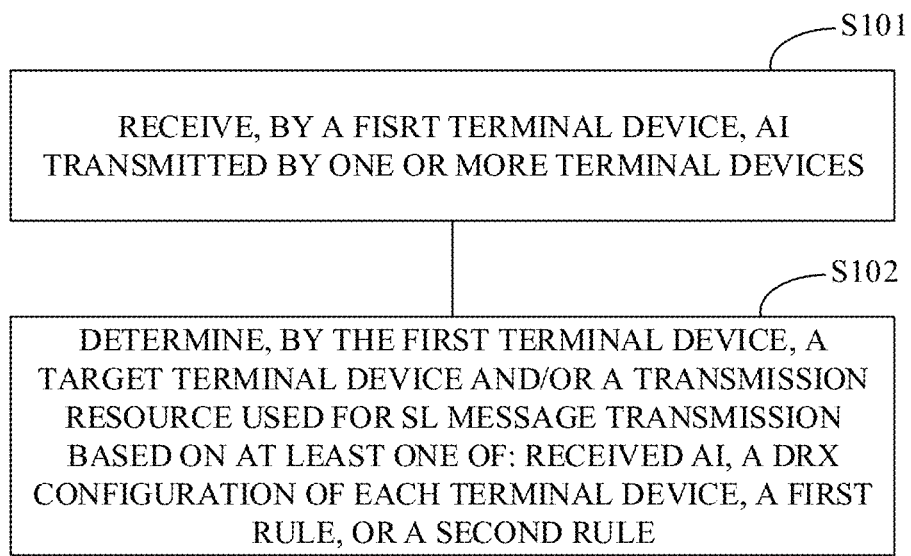
FIG. 4 is a flow chart of a method for SL communication at a terminal side according to implementations of the present disclosure.

To this end, the implementations of the present disclosure provide a method for SL communication, which is applicable to a terminal device. With reference to FIG. 4, the method includes the following.

In S101, a first terminal device receives AI transmitted by one or more terminal devices.

In S102, the first terminal device determines a target terminal device and/or a transmission resource used for SL message transmission based on at least one of: the received AI, a DRX configuration of each terminal device, a first rule, or a second rule.

According to implementations of the present disclosure, in SL communication, each terminal device can receive AI transmitted by one or more other terminal devices, and a terminal device (a transmitting terminal) can determine, based on received AI, a DRX configuration of each terminal device, and/or a preset rule, a target terminal (a receiving terminal) for receiving an SL message and/or a transmission resource used for SL message transmission. In this way, information or state such as AI from one or more terminal devices and a DRX configuration of each terminal device can be reasonably considered, which helps the transmitting terminal reasonably determine the target terminal and the transmission resource, thereby improving SL communication efficiency to some extent.

In various implementations of the present disclosure, optionally, the first terminal device can use the received AI on at least one of the following occasions: ① before a resource exclusion procedure; ② after the resource exclusion procedure; ③ after a resource reservation (selection) procedure; ④ in a logical channel prioritization (LCP) procedure.

The manner of using the AI on different occasions is described below by means of various implementations.

Firstly, a manner in which a transmitting terminal uses AI from one UE on different occasions will be described.

In an implementation of the present disclosure, optionally, before the resource exclusion procedure, the first terminal device determines a second terminal device as a target terminal device based on the first rule. When the first terminal device has received AI transmitted by the second terminal device, the first terminal device can determine a first candidate resource set based on the AI transmitted by the second terminal device and a DRX configuration of the second terminal device, where the first candidate resource set is used in the resource exclusion procedure.

On the other hand, optionally, when the first terminal device does not receive the AI transmitted by the second terminal device, the first terminal device can determine the first candidate resource set based on the DRX configuration of the second terminal device, where the first candidate resource set is used in the resource exclusion procedure.

In an implementation of the present disclosure, optionally, after the resource exclusion procedure, the first terminal device determines the second terminal device as the target terminal device based on the first rule. When the first terminal device has received the AI transmitted by the second terminal device, the first terminal device can determine a second candidate resource set based on the AI transmitted by the second terminal device and the DRX configuration of the second terminal device, where the second candidate resource set is used in the resource reservation procedure.

On the other hand, optionally, when the first terminal device does not receive the AI transmitted by the second terminal device, the first terminal device can determine the second candidate resource set based on the DRX configuration of the second terminal device, where the second candidate resource set is used in the resource reservation procedure.

In an implementation of the present disclosure, optionally, after the resource reservation (or referred to as resource selection) procedure, the first terminal device determines the second terminal device as the target terminal device based on the first rule. When the first terminal device has received the AI transmitted by the second terminal device, the first terminal device can determine, based on the AI transmitted by the second terminal device and the DRX configuration of the second terminal device, a reserved resource from resources selected in the resource reservation procedure, where the reserved resource is used for transmitting an SL message to the second terminal device.

On the other hand, optionally, when the first terminal device does not receive the AI transmitted by the second terminal device, the first terminal device can determine, based on the DRX configuration of the second terminal device, a reserved resource from the resources selected in the resource reservation procedure, where the reserved resource is used for transmitting an SL message to the second terminal device.

In the foregoing various implementations, optionally, the first rule may include at least one of the following: (1) the first terminal device determines a terminal device that triggers a resource selection procedure as the target terminal device; (2) the first terminal device determines a terminal device corresponding to a logical channel (LCH) with the highest priority or a medium access control control element (MAC CE) with the highest priority as the target terminal device.

Based on at least one of the above implementations, optionally, the first terminal device can select an LCH corresponding to the target terminal device, and assemble a medium access control protocol data unit (MAC PDU) to be transmitted to the target terminal device.

The following describes a manner in which the transmitting terminal uses AI from multiple UEs on different occasions.

In an implementation of the present disclosure, optionally, before the resource exclusion procedure, the first terminal device can determine the first candidate resource set based on the AI transmitted by the multiple terminal devices and DRX configurations of the multiple terminal devices, where the first candidate resource set is used in the resource exclusion procedure. After the resource reservation procedure, the first terminal device can determine the target terminal device based on the second rule.

Optionally, in a resource filtering procedure, when there is no match between the AI transmitted by the multiple terminal devices and the DRX configurations of the multiple terminal devices, the first terminal device can determine the first candidate resource set.

In an implementation of the present disclosure, optionally, after the resource exclusion procedure, the first terminal device can determine the second candidate resource set based on the AI transmitted by the multiple terminal devices and the DRX configurations of the multiple terminal devices, where the second candidate resource set is used in the resource reservation procedure. After the resource reservation procedure, the first terminal device can determine the target terminal device based on the second rule.

Optionally, in the resource filtering procedure, when there is no match between the AI transmitted by the multiple terminal devices and the DRX configurations of the multiple terminal devices, the first terminal device can determine the second candidate resource set.

In an implementation of the present disclosure, optionally, after the resource reservation procedure, the first terminal device can determine, based on the AI transmitted by the multiple terminal devices and the DRX configurations of the multiple terminal devices, a reserved resource from resources selected in the resource reservation procedure, where the reserved resource is used for transmitting an SL message to the target terminal device. The first terminal device can determine the target terminal device based on the second rule.

In an implementation of the present disclosure, optionally, in the LCP procedure, the first terminal device can determine the target terminal device based on the second rule.

In the foregoing various implementations, optionally, the second rule may include at least one of the following: (1) the first terminal device determines a terminal device that triggers a resource selection procedure as the target terminal device; (2) the first terminal device determines a terminal device corresponding to an LCH with the highest priority or an MAC CE with the highest priority as the target terminal device; (3) the first terminal device determines a terminal device as the target terminal, where a degree of match between AI transmitted by the terminal device and the selected transmission resource is highest; (4) the first terminal device determines a terminal device in a DRX activation state as the target terminal device.

Based on at least one of the above implementations, optionally, the first terminal device can assemble the MAC PDU to be transmitted to the target terminal device.

According to various implementations of the present disclosure, optionally, when the first terminal device determines the target terminal device and/or the transmission resource based on a DRX configuration, the first terminal device can select the terminal device in the DRX activation state.

By means of at least one of the above implementations of the present disclosure, after the resource selection is triggered, a transmitting terminal can reasonably determine a target terminal and an available resource for SL communication by using received AI, a DRX configuration, and/or a preset rule on a selected occasion (for example, before the resource exclusion procedure, after the resource exclusion procedure, after the resource reservation procedure, or in the LCP procedure). For example, the transmitting terminal can perform resource filtering or check based on AI transmitted by multiple terminal devices and DRX configurations of the multiple terminal devices to select an available transmission resource. The transmitting terminal can determine a terminal device corresponding to an LCH with the highest priority or an MAC CE with the highest priority as the target terminal device, or determine a terminal device whose AI has a highest degree of match with the selected transmission resource as the target terminal device, and the like, thereby improving SL communication efficiency.

The implementation manner of the method for SL communication of the implementations of the present disclosure is described by means of the implementations above. The implementation process of the implementations of the present disclosure is described below by means of multiple specific examples. In each implementation, UE_B represents a UE for transmitting an SL message.

Implementation 1

In this implementation, AI from no more than one UE is selected, and the AI is considered before the first step (resource exclusion) of resource selection.

Figure 5:
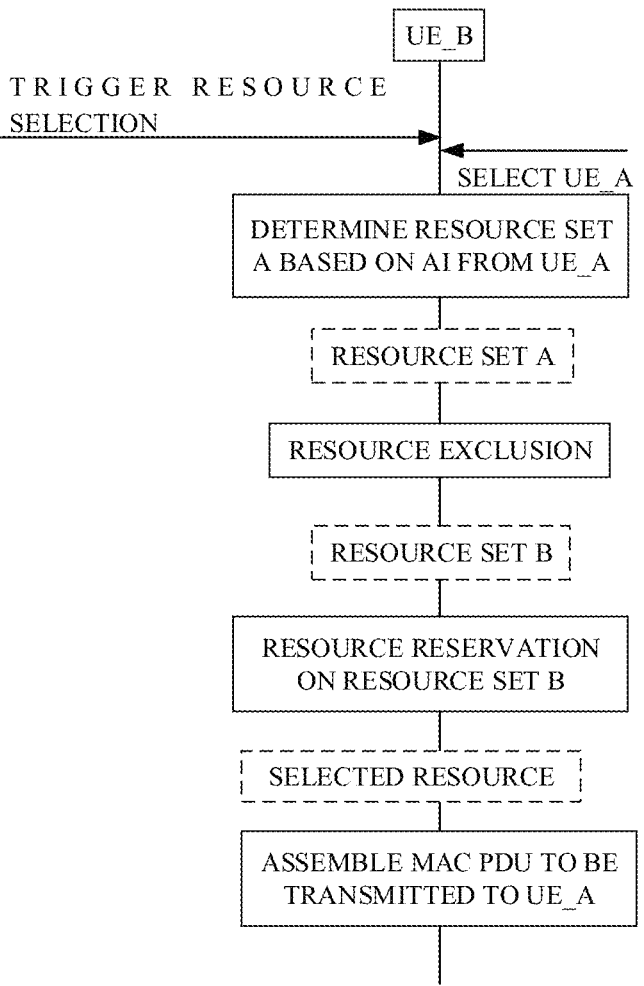
FIGS. 5-11 are schematic diagrams each illustrating a process of determining a target terminal and a transmission resource according to implementations of the present disclosure.

With reference to FIG. 5, UE_B receives AI transmitted by one or more UEs, and after resource selection is triggered, UE_B can determine a target UE (or namely a transmission target address) based on a preset rule, which is recorded as UE_A, where the target address may be an address that has transmitted AI or an address that transmits no AI. The preset rule may be at least one of: an address corresponding to an LCH triggering this resource selection or an MAC CE triggering this resource selection; or an address corresponding to an LCH with the highest priority or an MAC CE with the highest priority at current time.

After determining UE_A as the target address, UE_B can perform resource filtering based on a specific condition of UE_A to obtain candidate resource set A, where the specific condition of UE_A may include a DRX configuration of UE_A and/or information carried in AI. If UE_A has not transmitted AI to UE_B the information carried in the AI does not need to be considered.

After candidate resource set A is obtained, UE_B can perform resource exclusion, resource reservation, etc., which are described briefly below.

UE_B can perform resource exclusion on set A to obtain set B. If the number of remaining resources in set B is less than a proportion, UE_B can adjust an RSRP threshold and repeat resource exclusion until the number of remaining resources in set B is greater than or equal to the proportion. UE_B can select one or more resources from set B. Based on this, UE_B can select an LCH corresponding to the target address, i.e., UE_A, and assemble an MAC PDU to be transmitted to UE_A.

Implementation 2

In the implementation, AI from no more than one UE is selected, and the AI is considered after the first step (resource exclusion) of resource selection.

Figure 6:
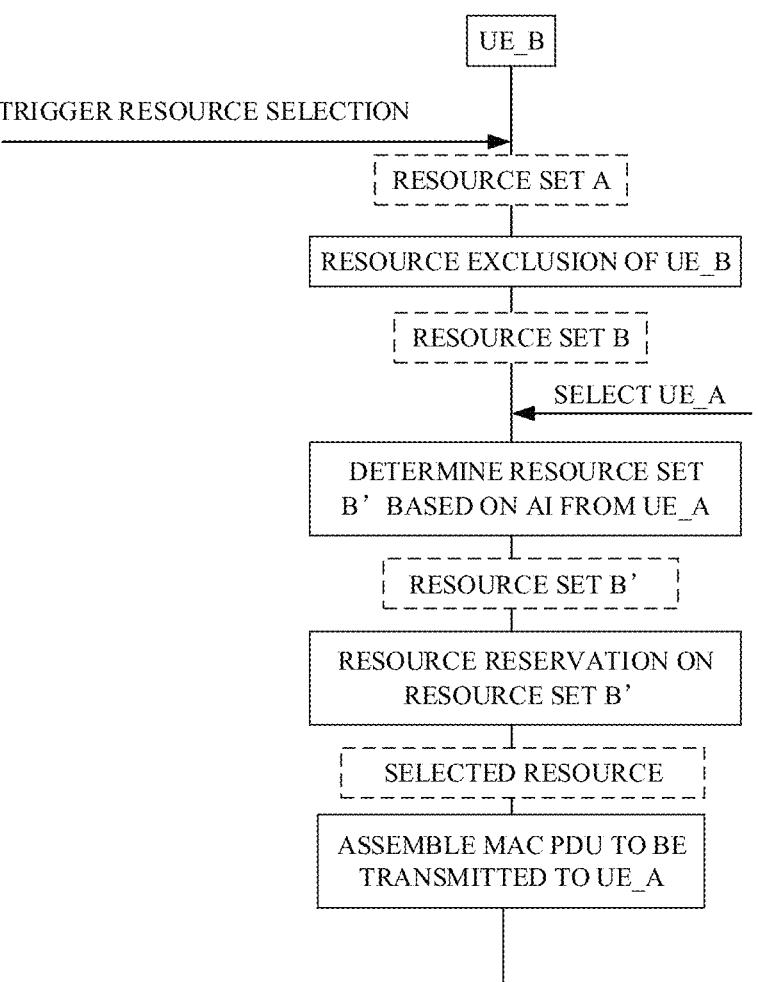

With reference to FIG. 6, UE_B receives AI transmitted by one or more UEs, and after resource selection is triggered, UE_B can perform resource exclusion, which is substantially as follows. UE_B can perform resource exclusion on set A to obtain set B. If the number of remaining resources in set B is less than a proportion, then UE_B can adjust an RSRP threshold and repeat resource exclusion until the number of remaining resources in set B is greater than or equal to the proportion.

After the resource exclusion procedure, UE_B can determine a target UE (or namely a transmission target address) based on a preset rule, which is recorded as UE_A, where the target address may be an address that has transmitted AI or an address that transmits no AI. The preset rule may be at least one of: an address corresponding to an LCH triggering this resource selection or an MAC CE triggering this resource selection; an address corresponding to an LCH with the highest priority or an MAC CE with the highest priority at current time.

After determining UE_A as the target address, UE_B can perform resource filtering according to a specific condition of UE_A to obtain candidate resource set B', where the specific condition of UE_A may include a DRX configuration of UE_A and/or information carried in AI. If UE_A has not transmitted AI to UE_B the information carried in the AI does not need to be considered.

After candidate resource set B' is obtained, UE_B can perform resource reservation to select one or more resources from set B'. Based on this, UE_B can select an LCH corresponding to the target address, i.e., UE_A, and assemble an MAC PDU to be transmitted to UE_A.

Implementation 3

In this implementation, AI from no more than one UE is selected, and the AI is considered after the second step (resource reservation) of resource selection.

Figure 7:
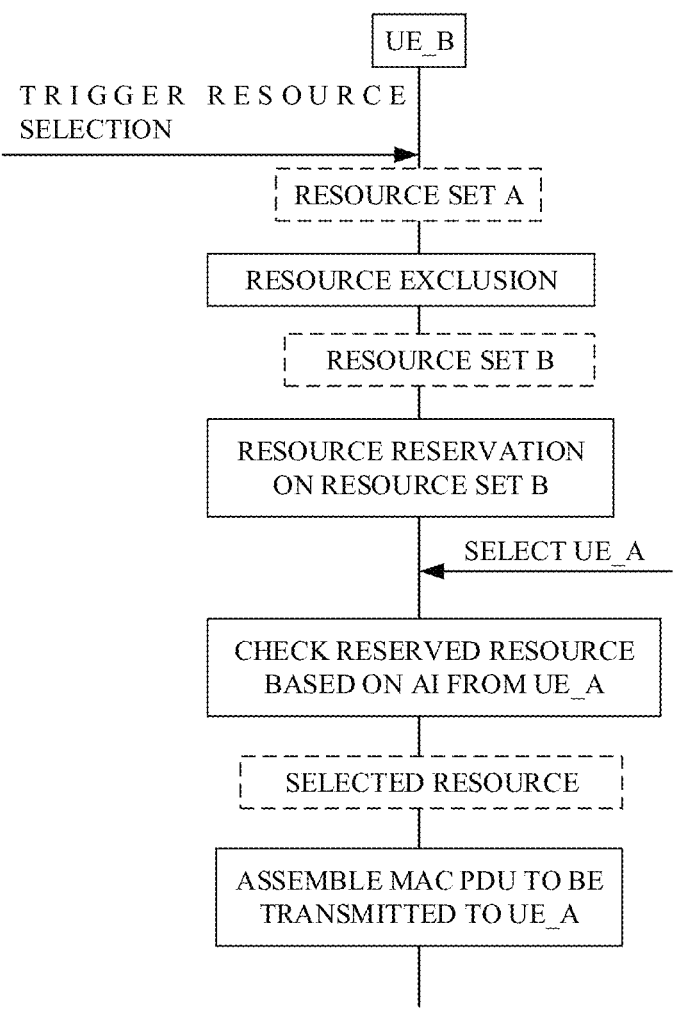

With reference to FIG. 7, UE_B receives AI transmitted by one or more UEs, and after resource selection is triggered, UE_B can perform resource exclusion and resource reservation, which are substantially as follows. UE_B can perform resource exclusion on set A to obtain set B. If the number of remaining resources in set B is less than a proportion, then UE_B can adjust an RSRP threshold and repeat resource exclusion until the number of remaining resources in set B is greater than or equal to the proportion. UE_B can select one or more resources from set B.

After the resource reservation, UE_B can determine a target UE (or namely a target address) based on a preset rule, which is recorded as UE_A, where the target address may be an address that has transmitted AI or an address that transmits no AI. The preset rule may be at least one of: an address corresponding to an LCH triggering this resource selection or an MAC CE triggering this resource selection; or an address corresponding to an LCH with the highest priority or an MAC CE with the highest priority at current time.

After determining UE_A as the target address, UE_B can check the selected resource(s) based on a specific condition of UE_A to obtain a match resource(s), where the specific condition of UE_A may include a DRX configuration of UE_A and/or information carried in AI. If UE_A has not transmitted AI to UE_B, the information carried in the AI does not need to be considered.

After the match resource(s) is determined, UE_B can select an LCH corresponding to the target address, i.e., UE_A, and assemble an MAC PDU to be transmitted to UE_A.

Implementation 4

In this implementation, AI from more than one UE is selected, and the AI is considered before the first step (resource exclusion) of resource selection.

Figure 8:
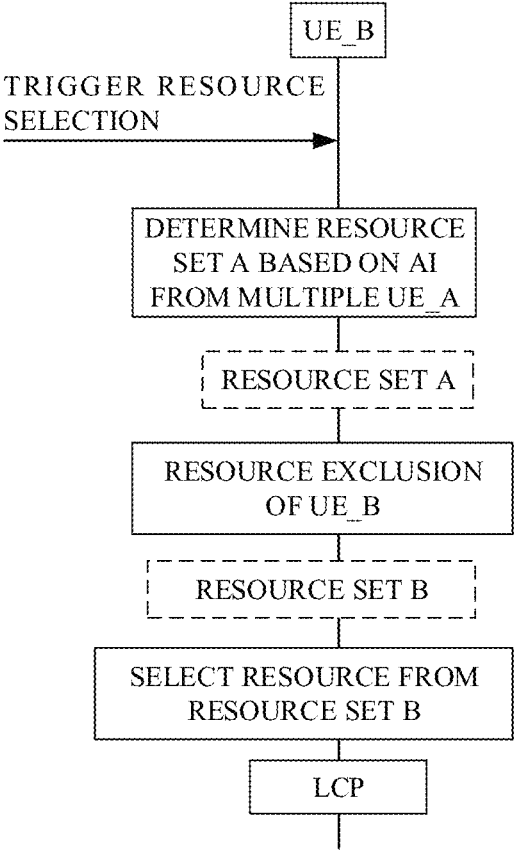

With reference to FIG. 8, UE_B receives AI transmitted by multiple UEs (such as UE_A, UE_C, and UE_D). After resource selection is triggered, UE_B can perform resource filtering based on specific conditions of the multiple UEs to obtain candidate resource set A, where the specific conditions of the multiple UEs include DRX configurations of the multiple UEs and/or information carried in the AI from the multiple UEs. In the case where there is no match between the AI from the multiple UEs and the DRX configurations of the multiple UEs, UE_B can determine candidate resource set A.

After candidate resource set A is obtained, UE_B can perform resource exclusion and resource reservation, which are substantially as follows. UE_B can perform resource exclusion on set A to obtain set B. If the number of remaining resources in set B is less than a proportion, UE_B can adjust an RSRP threshold and repeat resource exclusion until the number of remaining resources in set B is greater than or equal to the proportion. UE_B can select one or more resources from set B.

After the resource reservation, UE_B can determine a target UE (or namely a transmission target address) based on a preset rule, where the target address may be an address that has transmitted AI or an address that transmits no AI. The preset rule may be at least one of: an address corresponding to an LCH with the highest priority or an MAC CE with the highest priority at current time; in a DRX activation state at the selected resource to receive data; a degree of match between AI from an address and the selected resource being the highest; or an address corresponding to an LCH triggering this resource selection or an MAC CE triggering this resource selection.

The preset rule is described by means of examples. Assuming that UE_A, UE_C, and UE_D each has a downlink service, several cases that may exist are exemplarily provided in the following:

A. if UE_A corresponds to an LCH with the highest priority or an MAC CE with the highest priority, then UE_A is determined as the target address;

B. if the priorities of UE_A and UE_C are the same and higher than that of UE_D, UE_D may be excluded first, a) if UE_A has transmitted AI to UE_B and UE_C transmits no AI to UE_B, UE_A can be excluded;

b) if both UE_A and UE_C have transmitted AI to UE_B, select from UE_A and UE_C a UE with a high degree of AI match as the target address;

c) if both UE_A and UE_C transmit no AI to UE_B, UE_B can select one of UE_A and UE_C as the target address.

After determining the target address, UE_B can assemble an MAC PDU to be transmitted to the target address.

Implementation 5

In this implementation, AI from more than one UE is selected, and the AI is considered after the first step (resource exclusion) of resource selection.

Figure 9:
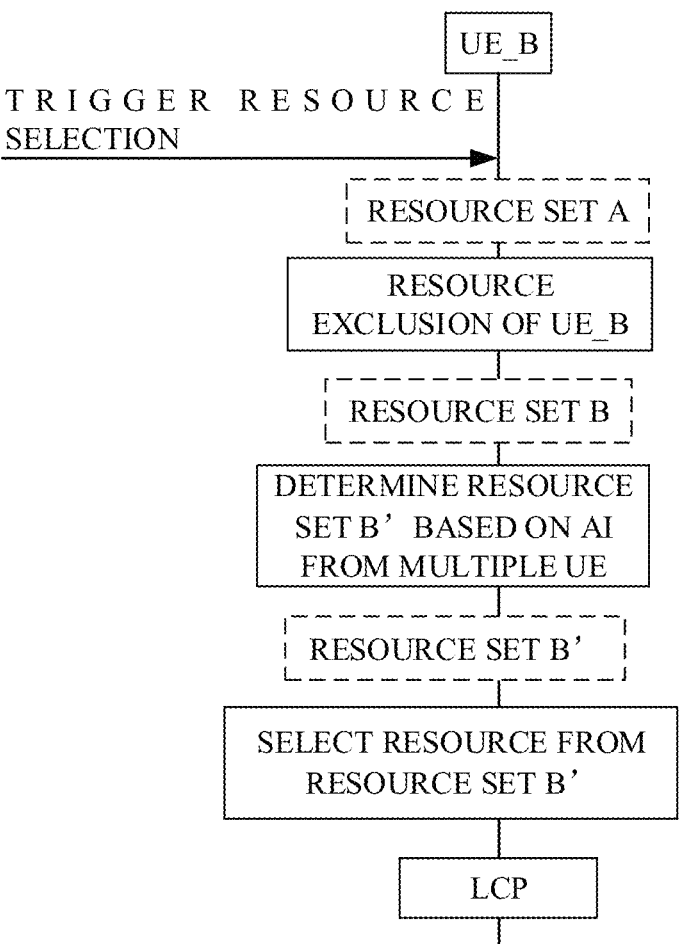

With reference to FIG. 9, UE_B receives AI transmitted by multiple UEs (such as UE_A, UE_C, and UE_D). After resource selection is triggered, UE_B can perform resource exclusion, which is substantially as follows. UE_B can perform resource exclusion on set A to obtain set B. If the number of remaining resources in set B is less than a proportion, UE_B can increase an RSRP threshold and repeat resource exclusion until the number of remaining resources in set B is greater than or equal to the proportion.

After the resource exclusion procedure, UE_B can perform resource filtering based on specific conditions of the multiple UEs to obtain candidate resource set B', where the specific conditions of the multiple UEs include DRX configurations of the multiple UEs and/or information carried in the AI from the multiple UEs. When there is no match between the AI from the multiple UEs and the DRX configurations of the multiple UEs, UE_B can determine candidate resource set B'.

After candidate resource set B' is obtained, UE_B can perform resource reservation to select one or more resources from set B'.

After the resource reservation, UE_B can determine a target UE (or namely a transmission target address) based on a preset rule, where the target address may be an address that has transmitted AI or an address that transmits no AI. The preset rule may be at least one of: an address corresponding to an LCH with the highest priority or an MAC CE with the highest priority at current time; in a DRX activation state at the selected resource to receive data; a degree of match between AI from an address and the selected resource being the highest; or an address corresponding to an LCH triggering this resource selection or an MAC CE triggering this resource selection.

For the execution logic of the preset rule, reference can be made to the example in implementation 4. After the target address is determined, UE_B can assemble an MAC PDU to be transmitted to the target address.

Implementation 6

In this implementation, AI from more than one UE is selected, and the AI is considered after the second step (resource reservation) of resource selection.

Figure 10:
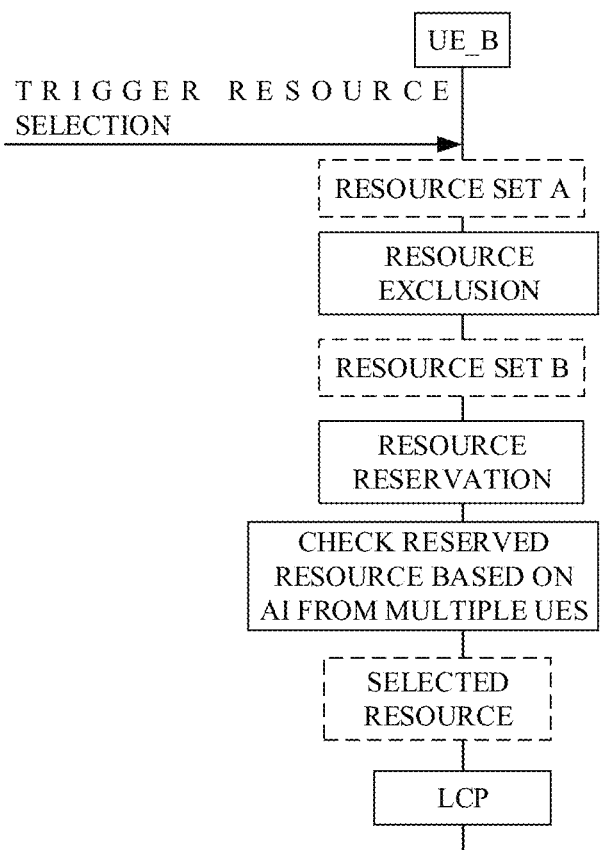

With reference to FIG. 10, UE_B receives AI transmitted by multiple UEs (such as UE_A, UE_C, and UE_D). After resource selection is triggered, UE_B can perform resource exclusion and resource reservation, which are substantially as follows. UE_B can perform resource exclusion on set A to obtain set B. If the number of remaining resources in set B is less than a proportion, UE_B can adjust an RSRP threshold and repeat resource exclusion until the number of remaining resources in set B is greater than or equal to the proportion. UE_B can select one or more resources from set B.

After the resource reservation, UE_B can check the selected resource(s) based on specific conditions of the multiple UEs to obtain a match resource(s), where the specific conditions of the multiple UEs may include DRX configurations of the multiple UEs and/or information carried in the AI from the multiple UEs. When there is no match between the AI from the multiple UEs and the DRX configurations of the multiple UEs, UE_B can determine a resource to be used.

After the resource to be used is determined, UE_B can determine a target UE (or namely a transmission target address) based on a preset rule, where the target address may be an address that has transmitted AI or an address that transmits no AI. The preset rule may be at least one of: an address corresponding to an LCH with the highest priority or an MAC CE with the highest priority at current time; in a DRX activation state at the selected resource to receive data; a degree of match between AI from an address and the selected resource being the highest; or an address corresponding to an LCH triggering this resource selection or an MAC CE triggering this resource selection.

For the execution logic of the preset rule, reference can be made to the example in Implementation 4. After the target address is determined, UE_B can assemble an MAC PDU to transmitted to the target address.

Implementation 7

In this implementation, AI is considered in the LCP procedure.

Figure 11:
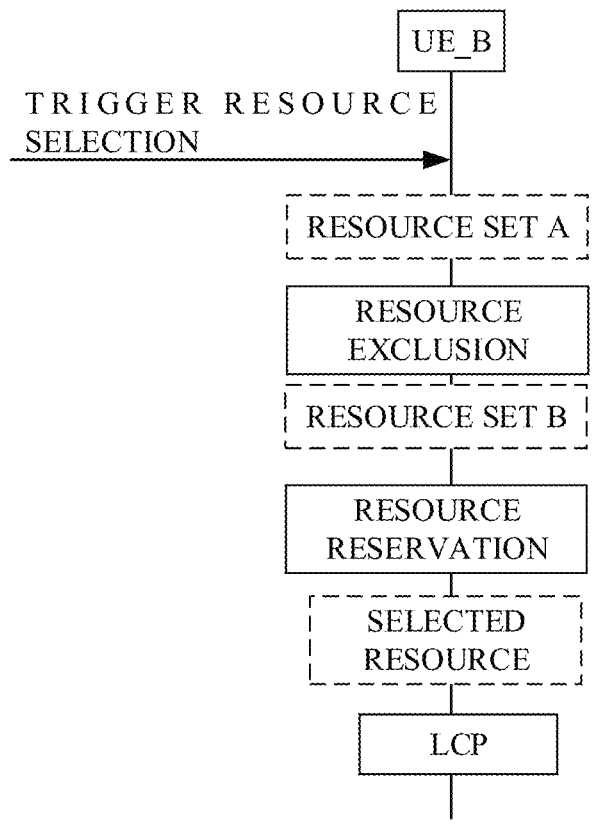

With reference to FIG. 11, UE_B receives AI transmitted by multiple UEs (such as UE_A, UE_C, and UE_D). After resource selection is triggered, UE_B can perform resource exclusion and resource reservation, which are substantially as follows. UE_B can perform resource exclusion on set A to obtain set B. If the number of remaining resources in set B is less than a proportion, UE_B can adjust an RSRP threshold and repeat resource exclusion until the number of remaining resources in set B is greater than or equal to the proportion. UE_B can select one or more resources from set B.

After the resource reservation, UE_B can determine a target UE (or namely a transmission target address) based on a preset rule, where the target address may be an address that has transmitted AI or an address that transmits no AI. The preset rule may be at least one of: an address corresponding to an LCH with the highest priority or an MAC CE with the highest priority at current time; in a DRX activation state at the selected resource to receive data; a degree of match between AI from an address and the selected resource being the highest; or an address corresponding to an LCH triggering this resource selection or an MAC CE triggering this resource selection.

For the execution logic of the preset rule, reference can be made to the example in Implementation 4. After the target address is determined, UE_B can assemble an MAC PDU to be transmitted to the target address.

Figure 12:
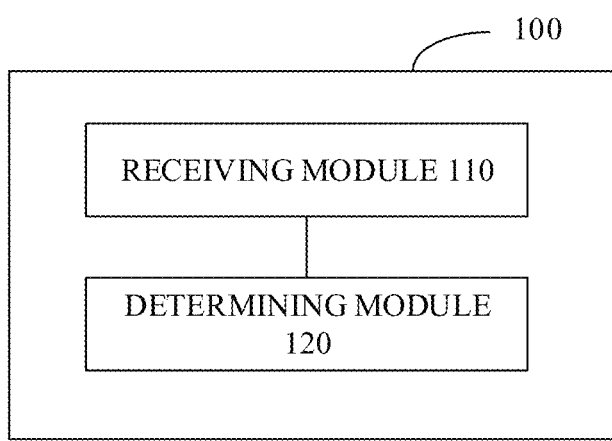
FIG. 12 is a schematic structural block diagram of a terminal device according to implementations of the present disclosure.

By means of multiple implementations, the foregoing describes specific settings and implementation manners of the implementations of the present disclosure from different perspectives. Corresponding to the processing method of at least one implementation, the implementations of the present disclosure further provide a terminal device 100. Referring to FIG. 12, the terminal device 100 includes a receiving module 110 and a determining module 120. The receiving module 110 is configured to receive AI transmitted by one or more terminal devices. The determining module 120 is configured to determine a target terminal device and/or a transmission resource used for SL message transmission based on at least one of: the received AI, a DRX configuration of each terminal device, a first rule, or a second rule.

Optionally, the determining module 120 is configured to use the received AI on at least one of the following occasions: before a resource exclusion procedure, after the resource exclusion procedure, after a resource reservation procedure, and in a logic channel prioritization (LCP) procedure.

Optionally, the determining module 120 is configured to determine the target terminal device based on the first rule, and determine the transmission resource based on AI transmitted by the target terminal device and/or a DRX configuration of the target terminal device.

Optionally, the determining module 120 is configured to determine a second terminal device as the target terminal device based on the first rule before the resource exclusion procedure, and determine a first candidate resource set based on AI transmitted by the second terminal device and a DRX configuration of the second terminal device when the receiving module has received the AI transmitted by the second terminal device, where the first candidate resource set is used in the resource exclusion procedure.

Optionally, the determining module 120 is configured to determine the first candidate resource set based on the DRX configuration of the second terminal device when the receiving module does not receive the AI transmitted by the second terminal device, where the first candidate resource set is used in the resource exclusion procedure.

Optionally, the determining module 120 is configured to determine the second terminal device as the target terminal device based on the first rule after the resource exclusion procedure, and determine a second candidate resource set based on the AI transmitted by the second terminal device and the DRX configuration of the second terminal device when the receiving module has received the AI transmitted by the second terminal device, where the second candidate resource set is used in the resource reservation procedure.

Optionally, the determining module 120 is configured to determine the second candidate resource set based on the DRX configuration of the second terminal device when the receiving module does not receive the AI transmitted by the second terminal device, where the second candidate resource set is used in the resource reservation procedure.

Optionally, the determining module 120 is configured to determine the second terminal device as the target terminal device based on the first rule after the resource reservation procedure, and determine, based on the AI transmitted by the second terminal device and the DRX configuration of the second terminal device, a third resource set from resources selected in the resource reservation procedure, when the receiving module has received the AI transmitted by the second terminal device, where the third resource set is used for transmitting an SL message to the second terminal device.

Optionally, the determining module 120 is configured to determine, based on the DRX configuration of the second terminal device, the third resource set from the resources selected in the resource reservation procedure, when the receiving module does not receive the AI transmitted by the second terminal device, where the third resource set is used for transmitting an SL message to the second terminal device.

Optionally, the first rule includes at least one of: determining, by the determining module, a terminal device that triggers a resource selection procedure as the target terminal device; or determining, by the determining module, a terminal device corresponding to an LCH with a highest priority or an MAC CE with a highest priority as the target terminal device.

Optionally, the terminal device 100 further includes a selecting module and an assembling module. The selecting module is configured to select an LCH corresponding to the target terminal device, and the assembling module is configured to assemble an MAC PDU to be transmitted to the target terminal device.

Optionally, the determining module 120 is configured to determine the transmission resource based on the AI transmitted by the multiple terminal devices and DRX configurations of the multiple terminal devices, and determine the target terminal device based on the second rule.

Optionally, the determining module 120 is configured to determine the first candidate resource set based on the AI transmitted by the multiple terminal devices and the DRX configurations of the multiple terminal devices before the resource exclusion procedure, where the first candidate resource set is used in the resource exclusion procedure. The determining module is configured to determine the target terminal device based on the second rule after the resource reservation procedure.

Optionally, the determining module 120 is configured to determine the first candidate resource set in a resource filtering process, when no match exists between the AI transmitted by the multiple terminal devices and the DRX configurations of the multiple terminal devices.

Optionally, the determining module 120 is configured to determine the second candidate resource set based on the AI transmitted by the multiple terminal devices and the DRX configurations of the multiple terminal devices after the resource exclusion procedure, where the second candidate resource set is used in the resource reservation procedure. The determining module is configured to determine the target terminal device based on the second rule after the resource reservation procedure.

Optionally, the determining module 120 is configured to determine the second candidate resource set in the resource filtering process, when no match exists between the AI transmitted by the multiple terminal devices and the DRX configurations of the multiple terminal devices.

Optionally, the determining module 120 is configured to determine, after a resource reservation procedure, a third resource set from resources selected in the resource reservation procedure, based on the AI transmitted by the multiple terminal devices and the DRX configurations of the multiple terminal devices, where the third resource set is used for transmitting an SL message to the target terminal device. The determining module is configured to determine the target terminal device based on the second rule after the resource reservation procedure.

Optionally, the determining module 120 is configured to determine the target terminal device based on the second rule in an LCP procedure.

Optionally, the second rule includes at least one of: determining, by the determining module, a terminal device that triggers a resource selection procedure as the target terminal device; determining, by the determining module 120, a terminal device corresponding to an LCH with a highest priority or an MAC CE with a highest priority as the target terminal device; determining, by the determining module 120, a terminal device whose AI has a highest degree of match with the selected transmission resource as the target terminal device; or determining, by the determining module 120, a terminal device in a DRX activation state as the target terminal device.

Optionally, the terminal device 100 further includes an assembling module configured to assemble an MAC PDU to be transmitted to the target terminal device.

Optionally, the determining module 120 is configured to select a terminal device in a DRX activation state when determining the target terminal device and/or the transmission resource based on the DRX configuration.

The terminal device 100 in the implementations of the present disclosure can implement corresponding functions of the device in the foregoing method implementations. For corresponding processes, functions, implementations, and beneficial effects of various modules (sub-modules, units, or components) of the terminal device 100, reference may be made to corresponding illustrations in the foregoing method implementations, and details are not described herein again.

It is to be noted that, functions of various modules (sub-modules, units or components, etc.) of the terminal device 100 of the implementation of the present disclosure may be implemented by different modules (sub-modules, units, or components, etc.), or may be implemented by the same module (a sub-module, unit, or component, etc.). For example, a first transmitting module and a second transmitting module may be different modules or may be the same module, and both the first transmitting module and the second transmitting module can achieve the corresponding functions thereof in the implementations of the present disclosure. In addition, the transmitting module and the receiving module in the implementations of the present disclosure can be realized by a transceiver of a device, and some or all of the other modules can be realized by a processor of the device.

Figure 13:
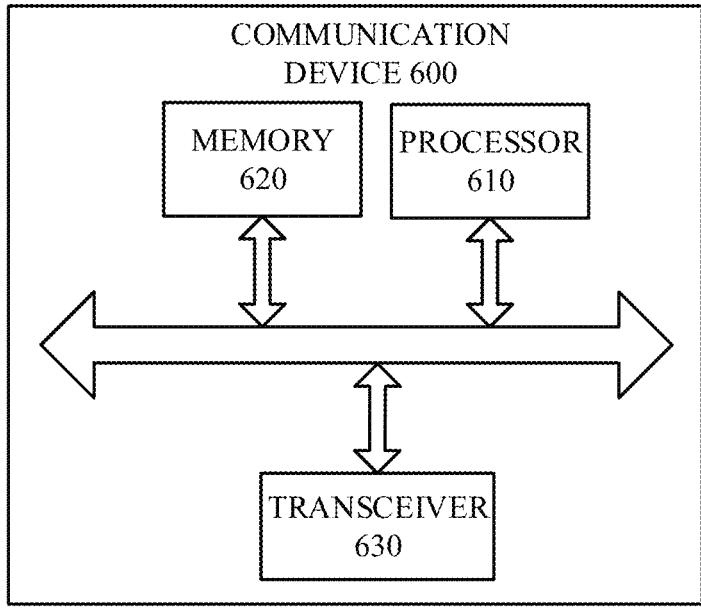
FIG. 13 is a schematic block diagram of a communication device according to implementations of the present disclosure.

FIG. 13 is a schematic structural diagram of a communication device 600 according to implementations of the present disclosure. The communication device 600 may include a processor 610, and the processor 610 may invoke and run a computer program in a memory, so as to implement the methods in the implementations of the present disclosure.

Optionally, the communication device 600 can further include a memory 620, where the processor 610 can call and run a computer program in the memory 620 to implement the methods in the implementations of the present disclosure.

The memory 620 may be independent of the processor 610, or may be integrated in the processor 610.

Optionally, the communication device 600 can further include a transceiver 630. The processor 610 can control the transceiver 630 to communicate with other devices, specifically, can transmit information or data to other devices or receive information or data transmitted by other devices.

The transceiver 630 may include a transmitter and a receiver. The transceiver 630 can further include one or more antennas.

Optionally, the communication device 600 may be the first terminal device in the implementations of the present disclosure, and the communication device 600 may implement corresponding processes implemented by the first terminal device in various methods in the implementations of the present disclosure. For brevity, details are not described herein again.

Optionally, the communication device 600 may be the second terminal device in the implementations of the present disclosure, and the communication device 600 may implement corresponding processes implemented by the terminal device in various methods in the implementations of the present disclosure. For brevity, details are not described herein again.

Figure 14:
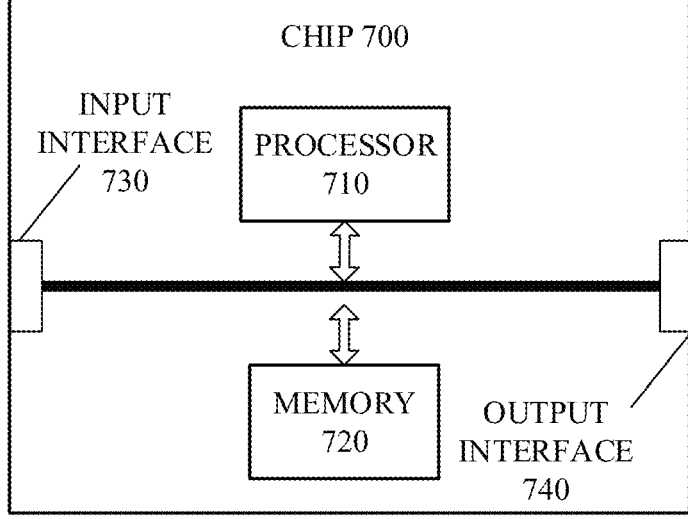
FIG. 14 is a schematic block diagram of a chip according to implementations of the present disclosure.

FIG. 14 is a schematic structural diagram of a chip 700 according to implementations of the present disclosure. The chip 700 may include a processor 710. The processor 710 may call a computer program from a memory and run the computer program, so as to implement the methods in the implementations of the present disclosure. The processor 710 may include at least one processor circuit.

Optionally, the chip 700 can further include a memory 720. The processor 710 can call and run a computer program in the memory 720 to implement the methods in the implementations of the present disclosure.

The memory 720 may be independent of the processor 710, or may be integrated in the processor 710.

Optionally, the chip 700 can further include an input interface 730. The processor 710 can control the input interface 730 to communicate with other devices or chips, specifically, can acquire information or data transmitted by other devices or chips.

Optionally, the chip 700 can further include an output interface 740. The processor 710 may control the output interface 740 to communicate with other devices or chips, specifically, may output information or data to other devices or chips.

Alternatively, the chip may be applied to the first terminal device in the implementations of the present disclosure, and the chip may implement a corresponding process implemented by the first terminal device in each method in the implementations of the present disclosure. For brevity, details are not described herein again.

Alternatively, the chip may be applied to the second terminal device in the implementation of the present disclosure, and the chip may implement a corresponding process implemented by the terminal device in each method in the implementation of the present disclosure. For brevity, details are not described herein again.

It is to be understood that the chip mentioned in the implementations of the present disclosure may also be referred to as a system-level chip, a system chip, a chip system, a system-on-chip, or the like.

The foregoing processor may be a general processor, a digital signal processor (DSP), a field programmable gate array (FPGA), an application specific integrated circuit (ASIC), or another programmable logic device, a transistor logic device, a discrete hardware component, or the like. The general processor may be a microprocessor or any conventional processor.

The memory mentioned above may be a volatile memory or a non-volatile memory, or may include both volatile and non-volatile memories. The non-volatile memory may be a read-only memory (ROM), a programmable ROM (PROM), an erasable PROM (EPROM), an electrically erasable PROM (EEPROM), or a flash memory. The volatile memory may be a random access memory (RAM).

It is to be understood that the foregoing memories are exemplary but not limitative illustrations. For example, the memory in the implementations of the present disclosure may also be a static RAM (SRAM), a dynamic RAM (DRAM), a synchronous DDRM (SDRAM), a double data rate SDRAM) (DDR SDRAM), an enhanced SDRAM (ES-DRAM), a synchronous link DRAM (SDRAM), and a direct rambus RAM (DR RAM), etc. That is to say, the memory in the implementations of the present disclosure is intended to include, but is not limited to, these and any other suitable types of memory.

Figure 15:
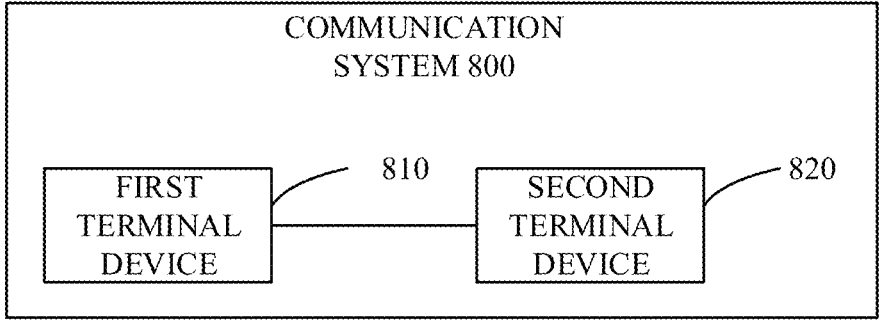
FIG. 15 is a schematic block diagram of a communication system according to implementations of the present disclosure.

FIG. 15 is a schematic block diagram of a communication system 800 according to implementations of the present disclosure, where the communication system 800 includes a first terminal device 810 and a second terminal device 820.

The first terminal device 810 may be configured to implement corresponding functions implemented by the first terminal device in the methods of the implementations of the present disclosure, and the second terminal device 820 may be configured to implement corresponding functions implemented by the second terminal device in the methods of the implementations of the present disclosure. For brevity, details are not described herein again.

The implementations described above may be implemented in whole or in part by software, hardware, firmware, or any combination thereof. When implemented using software, the implementations may be implemented in whole or in part in the form of a computer program product including one or more computer instructions. When the computer program instructions are loaded and executed on a computer, all or part of procedures or functions of the implementations of the present disclosure is generated. The computer may be a general purpose computer, a special purpose computer, a computer network, or other programmable apparatus. The computer instructions may be stored in a computer-readable storage medium or transmitted from one computer-readable storage medium to another computer-readable storage medium. For example, the computer instruction can be transmitted from one website, computer, server, or data center to another website, computer, server, or data center in a wired manner or in a wireless manner. Examples of the wired manner can be a coaxial cable, an optical fibre, a digital subscriber line (DSL), etc. The wireless manner can be, for example, infrared, wireless, microwave, etc. The computer-readable storage medium can be any computer accessible usable-medium or a data storage device such as a server, a data center, or the like which is integrated with one or more usable media. The usable medium can be a magnetic medium (such as a soft disc, a hard disc, or a magnetic tape), an optical medium (such as a digital video disc (DVD)), or a semiconductor medium (such as a solid state disk (SSD)), etc.

It is to be understood that, in various implementations described herein, the magnitude of a sequence number of each process does not mean an order of execution, and the order of execution of each process should be determined by its function and an internal logic and shall not constitute any limitation to an implementation process of implementations.

It can be clearly understood by a person skilled in the art that, for the purpose of convenient and brief illustration, for a detailed operation process of the foregoing system, devices, and units, reference may be made to a corresponding process in the foregoing method implementations, and details are not described herein again.

The foregoing descriptions are merely specific implementations of the present disclosure, and are not intended to limit the scope of protection of the present disclosure. Any variation or replacement readily figured out by a person skilled in the art within the technical scope disclosed in the present disclosure shall belong to the scope of protection of the present disclosure. Therefore, the scope of protection of the present disclosure should be subject to the scope of protection of the claims.

What is claimed is:

1. A method for sidelink (SL) communication, the method being applicable to a terminal device and comprising:

receiving, by a terminal device, assistance information (AI) transmitted by one or more other terminal devices; and determining, by the terminal device, a target terminal device and a transmission resource used for SL message transmission based on: the received AI and a rule;

wherein determining, by the terminal device, the target terminal device and the transmission resource used for SL message transmission comprises:

determining, by the terminal device, the target terminal device based on the rule, wherein the rule comprises that a device that triggers a resource selection procedure is determined as the target terminal device; and determining, by the terminal device, the transmission resource used for SL message transmission based on AI transmitted by the target terminal device;

wherein the terminal device uses the received AI after a resource exclusion procedure.

2. A terminal device, comprising:

a transceiver;

a processor coupled to the transceiver; and a memory configured to store a computer program;

wherein the processor is configured to execute the computer program to cause the terminal device to:

receive assistance information (AI) transmitted by one or more other terminal devices; and determine a target terminal device and a transmission resource used for SL message transmission based on: the received AI and a rule;

wherein determining the target terminal device and the transmission resource used for SL message transmission comprises:

determining the target terminal device based on the rule, wherein the rule comprises that a device that triggers a resource selection procedure is determined as the target terminal device; and determining the transmission resource used for SL message transmission based on AI transmitted by the target terminal device;

wherein the terminal device is configured to use the received AI after a resource exclusion procedure.

3. A non-transitory computer-readable storage medium configured to store a computer program, wherein the computer program is configured to cause a terminal device to:

receive assistance information (AI) transmitted by one or more other terminal devices; and determine a target terminal device and a transmission resource used for SL message transmission based on: the received AI and a rule;

wherein determining the target terminal device and the transmission resource used for SL message transmission comprises:

determining the target terminal device based on the rule, wherein the rule comprises that a device that triggers a resource selection procedure is determined as the target terminal device; and determining the transmission resource used for SL message transmission based on AI transmitted by the target terminal device;

wherein the terminal device is configured to use the received AI after a resource exclusion procedure.

4. The method of claim 1, wherein determining, by the terminal device, the target terminal device based on the rule comprises:

determining, by the terminal device, the target terminal device based on the rule after the resource exclusion procedure;

wherein determining, by the terminal device, the transmission resource used for SL message transmission based on the AI transmitted by the target terminal device comprises:

determining, by the terminal device, a candidate resource set based on the AI transmitted by the target terminal device and a discontinuous reception (DRX) configuration of the target terminal device, wherein the candidate resource set is used in a resource reservation procedure.

5. The terminal device of claim 2, wherein determining the target terminal device based on the rule comprises:

determining the target terminal device based on the rule after the resource exclusion procedure;

wherein determining the transmission resource used for SL message transmission based on the AI transmitted by the target terminal device comprises:

determining a candidate resource set based on the AI transmitted by the target terminal device and a discontinuous reception (DRX) configuration of the target terminal device, wherein the candidate resource set is used in a resource reservation procedure.

6. The non-transitory computer-readable storage medium of claim 3, wherein determining the target terminal device based on the rule comprises:

determining the target terminal device based on the rule after the resource exclusion procedure;

wherein determining the transmission resource used for SL message transmission based on the AI transmitted by the target terminal device comprises:

determining a candidate resource set based on the AI transmitted by the target terminal device and a discontinuous reception (DRX) configuration of the target terminal device, wherein the candidate resource set is used in a resource reservation procedure.

* * * * *